March 1, 1955 R. H. BURBANK 2,703,200
RECEPTACLE
Filed Feb. 8, 1954
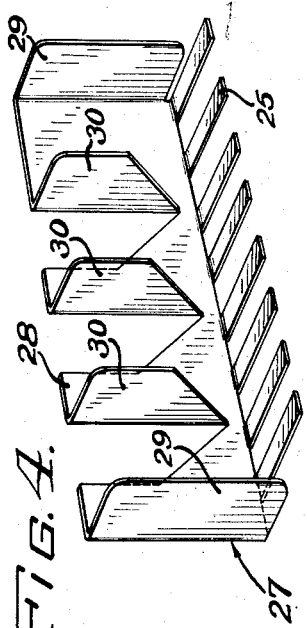
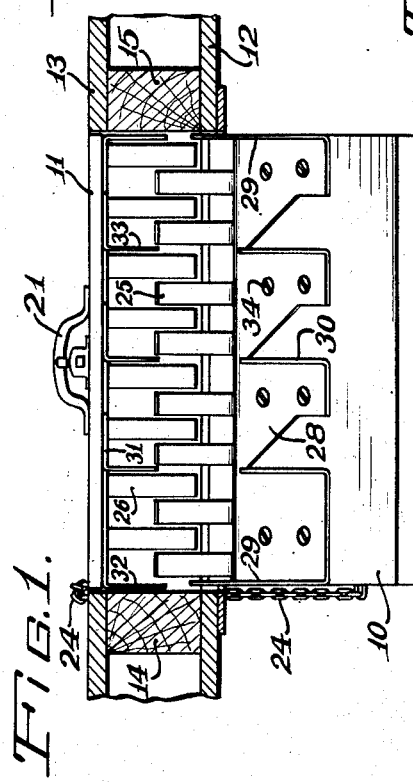
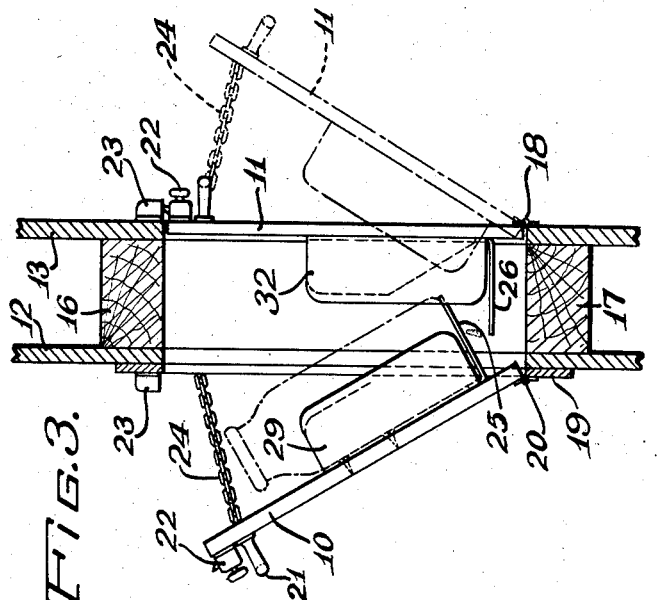
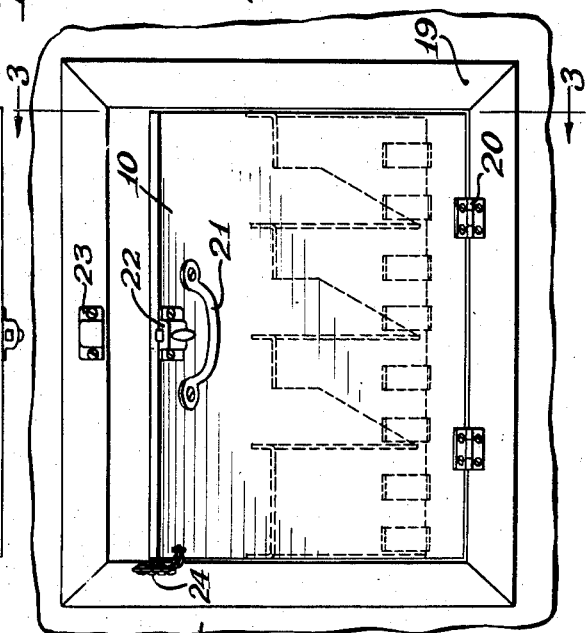
Inventor:
Richard Harris Burbank
By Gary, Desmond & Parker
Attys.

United States Patent Office 2,703,200
Patented Mar. 1, 1955

2,703,200

RECEPTACLE

Richard Harris Burbank, Stratford, Conn.

Application February 8, 1954, Serial No. 408,648

5 Claims. (Cl. 232—43.3)

This invention relates to a receptacle of novel construction particularly adapted for the receiving, storing and delivering of articles, such as milk bottles or the like, in respect to which the invention will be particularly described.

It is an object of the present invention to provide a receptacle which will allow a milkman to deliver milk through a drop panel into an area within the walls of a house where it may be retrieved by a housewife by opening another drop panel within the confines of the house.

A further object is to provide a receptacle of the class described which can be readily installed as a unit between the standard studding of a house, and which is of such compact arrangement that it may be wholly, or substantially wholly, contained between the wall thickness.

Other advantages of the receptacle of the present invention are that it permits easy delivery of milk by the milkman and convenient retrievement thereof by the housewife without going outdoors, similar convenience in handling or return of empty bottles and a place for storing same, and protective of the delivered milk by keeping it above ground level and preventing it from exposure to the weather or destructive ultraviolet light rays, mischief such as pilfering, or abuse and destruction by animals.

Other objects and advantages relate to details of construction and arrangement of parts, and the economies thereof, which will be apparent from a consideration of the following specification and drawings, wherein:

Fig. 1 is a plan view of my device with one door open and the other door closed, mounted within the walls of a house shown in section.

Fig. 2 is a front or interior elevational view of the arrangement shown in Fig. 1.

Fig. 3 is a sectional view on the line 3—3 of Fig. 2.

Fig. 4 is a perspective view of a unitary compartment divider and platform section for the doors of my device.

Referring to the drawings, the reference numerals 10 and 11 indicate a pair of drop panels or doors closing open areas formed in the inner and outer walls 12 and 13 respectively of a house, here for simplicity illustrated of frame construction but not limited thereto, and suitably between a pair of studs 14 and 15, and a pair of braces 16 and 17. The doors are each pivotally mounted at their lower edges either to the wall or a suitable framework, and for the purpose of illustration, the outer door 11 is shown mounted to the outer wall 13 by means of the hinges 18, and the inner door 10 is shown mounted to frame or decorative trim 19 on wall 12, by means of the hinges 20. The doors are each further provided with a suitable handle 21 and releasable fastening means such as a manually actuated catch 22 engageable with a keeper 23 on the wall, frame or trim, for maintaining the doors in locked vertical position. It will be understood that other locking means may be employed. I further provide suitable means for limiting the extent of outward pivotal movement of the respective doors, such as the link chains 24 to limit their drop or outward incline to about 30°, or just enough to conveniently insert or withdraw a milk bottle.

Secured to the inner face of the doors 10 and 11 substantially at right angles thereto and for swinging movement therewith are the platform sections 25 and 26 respectively, each comprised of a plurality of spaced fingers extendable between each other and from one door to substantially the other, that is in an interfingering or interdigitated relationship, and coplanar when each of the doors are closed.

These platform sections may suitably be formed integral with vertical divider means and from a single stamping, as illustrated in Fig. 4, which shows a unit 27 for mounting on one of the doors, like unit being mounted on the other differing only in the position of the platform fingers. Thus the unit 27 is formed from a sheet cut and bent to define the backing 28, defining end walls 29 intermediate divider walls 30 and platform section fingers 25. The fingers 26 likewise project from a backing 31 having end walls 32 and intermediate dividers 33. The units may be fixed to their respective doors as by means of screws 34. Although the fingers 25 and 26 are of substantially equal length and one set is in staggered relationship to each other, the described end and intermediate divider walls are suitably shorter than the fingers, and when more than half their length those on one unit may be slightly offset from those of the other.

In use, for the purpose of illustration, a milkman in delivering milk opens door 11 and downwardly deposits one or more bottles of milk into the partitioned spaces and onto the lifted fingers 26, and on closing the door the bottles are raised to the vertical and rest between the inside and exposed outside walls of the house, the divider and end walls retaining the bottle confined upright between the doors, the fingers 26 returning to coplanar relationship with the fingers 25. When the panel 10 within the house is opened, the bottle or bottles are picked up by the fingers 25 and drop against this panel, placing the bottles in a position where they can be readily picked up by the housewife. It will thus be seen that when one door is closed and the other opened, a confined bottle is always lifted onto the canted drop door for ease in accessibility, with the other attendant advantages hereinbefore described.

It will be understood that various modifications of the foregoing may be employed. For example, trim need not be employed for the inner door, or trim may be employed around both the inner and outer doors. Further, instead of hinging and securing the outer door to the wall of a house it may be secured to, for example, a rectangular frame adapted to be inserted in a wall opening, and in a similar manner the inner, with or without trim, may also be previously secured to such frame to provide a unitary pre-assembly, or subsequently secured thereto.

It will therefore be apparent that although I have described the preferred embodiment of my invention and certain modification thereof, it will be apparent to those skilled in the art that various other modifications may be made in the details thereof without departing from the spirit and scope of my invention as hereinafter claimed.

I claim:

1. A receptacle comprising support means, spaced inner and outer doors pivotally mounted thereon adjacent their lower edges, and a platform section fixed on each of said doors substantially at right angles thereto for swinging movement therewith, each platform section comprising a plurality of spaced fingers interdigitated with those of the other.

2. A receptacle comprising support means, spaced inner and outer doors pivotally mounted thereon adjacent their lower edges, and a platform section fixed on each of said doors substantially at right angles thereto for swinging movement therewith, each platform section comprising a plurality of spaced fingers interdigitated with those of the other, the fingers secured to one door projecting substantially to the opposed door and in coplanar relationship with each other when the doors are in vertical position.

3. A receptacle comprising support means, spaced inner and outer doors pivotally mounted thereon adjacent their lower edges, and a platform section fixed on each of said doors substantially at right angles thereto for swinging movement therewith, each platform section comprising a plurality of spaced fingers secured to one door projecting substantially to the opposed door and in coplanar relationship with each other when the doors are in vertical position, each door further including a pair of inwardly projecting end walls and intermediate divider means providing bottle receiving compartments.

4. A receptacle comprising support means, spaced inner and outer doors pivotally mounted thereon adjacent their lower edges, and a platform section fixed on each of said doors substantially at right angles thereto for swinging movement therewith, each platform section comprising a plurality of spaced fingers secured to one door projecting substantially to the opposed door and in coplanar relationship with each other when the doors are in vertical position, each door further including a pair of inwardly projecting end walls and intermediate divider means providing bottle receiving compartments, means for releasably locking said doors in vertical position, and means for angularly limiting pivotal movement of said doors in open position.

5. The combination with spaced walls of a house formed with an opening therethrough, of a pair of spaced inner and outer doors pivotally supported on said walls adjacent their lower edges and forming a closure for said opening, and a platform section fixed on each of said doors substantially at right angles thereto for swinging movement therewith, each platform section comprising a plurality of spaced fingers interdigitated with those of the other.

References Cited in the file of this patent

UNITED STATES PATENTS

| | | |
|---|---|---|
| 131,983 | Walsh | Oct. 8, 1872 |
| 1,233,972 | Bryfogle | July 17, 1917 |
| 1,469,359 | Craw | Oct. 2, 1923 |
| 1,511,311 | Weible | Oct. 14, 1924 |
| 1,605,480 | Strunk | Nov. 2, 1926 |

FOREIGN PATENTS

| | | |
|---|---|---|
| 52,819 | Denmark | Mar. 15, 1937 |
| 290,404 | Germany | Oct. 11, 1927 |